Aug. 4, 1942.                D. H. POWERS                2,291,985
                FINNED TUBE AND METHOD OF PRODUCING THE SAME
                            Filed May 7, 1940

INVENTOR
Donald H. Powers
BY
Smith & Tuck
ATTORNEYS

Patented Aug. 4, 1942

2,291,985

UNITED STATES PATENT OFFICE 2,291,985

FINNED TUBE AND METHOD OF PRODUCING THE SAME

Donald H. Powers, Tacoma, Wash.

Application May 7, 1940, Serial No. 333,782

4 Claims. (Cl. 113—118)

My present invention relates to an improved finned tube and method of producing the same.

There are many demands for a tube having fins longitudinally disposed within the interior thereof, or along the exterior in a longitudinal plane, or both in the interior and exterior of the same tube. The uses of a finned tube are multitudinous and for the purposes of this application the description will relate to the installation of such a tube in a heat-transfer unit or a pre-heater device for conditioning air in a hot-air furnace. It is, of course, to be understood that I am not to be limited within the scope of my invention by my description of the invention as being employed in this specific manner.

Finned tubes have been produced by casting operations and the like, but in industry where fabrication from sheet metal and assembly methods employing the electric or arc welding practices is very common, it is more desirable to produce a finned tube according to my invention.

One method for the formation or fabrication of a tube having inner and outer longitudinally disposed fins has been to roll a sheet of metal into a cylindrical form and then to weld or otherwise secure on the inner and outer surfaces of that cylinder, relatively long and narrow strips of metal which form longitudinal fins. It should be readily apparent with this method, however, that in small-sized tubes it is next to impossible to perform rapidly and neatly the production of such a tube where the fins must be fitted close together and be alined radially or to any other predetermined angle.

According to the principles of my invention, as will be more apparent during the course of the following description, I fabricate my tube assembling a plurality of segmental or arcuate wall sections, each having flange members formed along longitudinal edges which later become the longitudinal fins, above referred to.

It has been an important object of my invention to originate a method of forming longitudinally finned tubes or cylinders wherein the operation of assembly may be carried on with the utmost of ease and efficiency.

It has been another important object of my invention to produce a method of forming finned tubes wherein is employed a plurality of pre-fabricated arcuate wall sections which during the course of the practice of my method are joined together to form a unitary longitudinally finned tubular structure.

A further object of my invention has been the development of a method of producing finned tubes in which may be employed the efficient practices now common in the arc and electric welding arts whereby the product of my process will have the utmost neatness and finished appearance when completed.

Another object of my invention has been the production of a finned tube having interior longitudinally extending members which are disposed at an angle to the tubular wall.

Still another object of my invention has been the origination of a method of forming longitudinally finned tubes wherein a plurality of tube wall segments which have been previously formed by simple rolling and bending or other forming operations, can be joined together to form a tube having greater strength and resistance to malformation when employed in the presence of high heat than would be true of a cylinder having a similar size and weight of material produced by any other method.

A still further object of the invention resides in the provision of a finned tube to be employed in heat-transfer devices for the absorption and conveyance of heat units from gases in an encircling chamber to air within the tubular interiorly finned chamber.

Other and important objects of the invention will appear during the course of the following description, wherein the principles of my invention are set forth in a structure which forms a practical example of the invention, but which example is used merely for descriptive purposes.

In the drawing:

Figure 1 presents, in a perspective view, a finned tube of the nature produced according to my method.

Figure 2 presents in perspective a heat-transfer device in which is employed a finned tube of the type shown in Figure 1.

Figure 4:
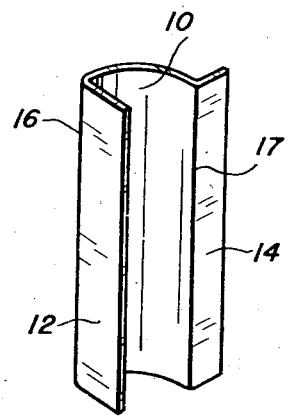
Figure 4 is a perspective view of one of the individual flanged wall units employed in the formation of the finned tubing of Figure 1.

In the drawing, it will be seen that the principle of my invention relates to the formation of a finned tube which is composed of a plurality of wall sections of the nature shown in Figure 4 in which there is illustrated a curved walled segment 10 having an inwardly bent angularly disposed flange 12, and also having an outwardly bent angularly disposed flange 14. While the showing of Figure 4 includes the inner flange 12 and the outer flange 14, it is pointed out and to be understood that the practice of my method and the production of my finned tube is particularly directed to the development of a finned tube having multiple inner flanges and that the outer multiple flanges 14 may be omitted if they are unnecessary or for the purposes of economy.

Figure 1:
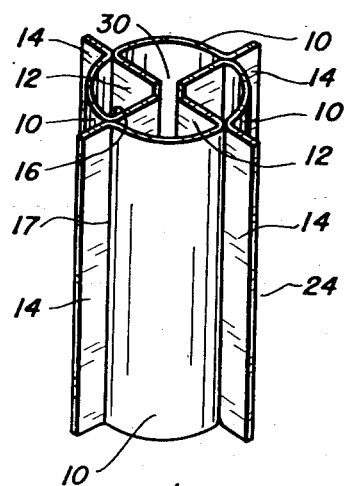
Figure 2:
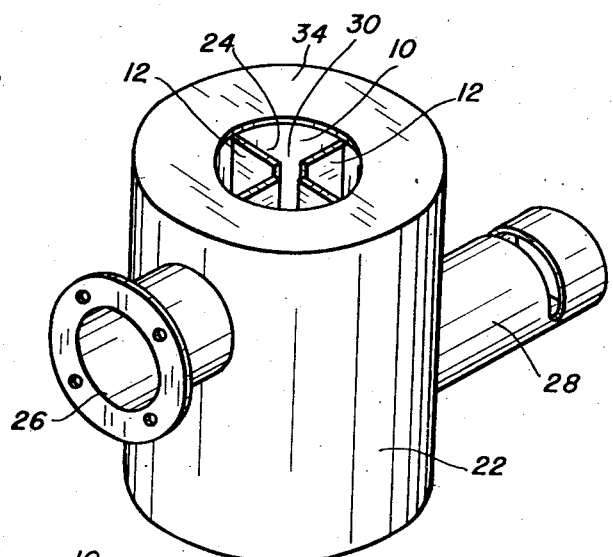
Figure 3:
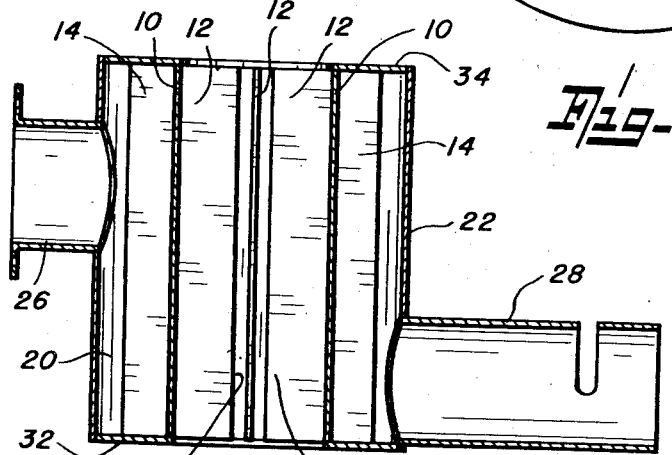
Figure 3 is a vertical medial sectional view taken through the device of Figure 2.

In Figure 1 is shown the finned tube as being formed of four sections 10, in which case each section would be substantially a quarter of the circumference of the finished tube, but where a fewer or greater number of fins are desired, naturally fewer arcuate wall segments or a greater number of arcuate wall segments would be combined to produce the desired structure.

A unit such as is shown in Figure 4 may be fabricated in any one of a number of ways, either with a drop hammer, a drop forge, or in the case of the use of rather light-weight materials it can be formed by simple rolling and bending operations in any sheet metal working plant. Upon the formation of the desired number of wall segments 10 to form the unitary structure, at least a pair of segmental sections are placed in a suitable jig or other holding means so that a folded corner 16 of one segment rests adjacent a folded corner 17 of another segment and lies in such close proximity thereto as to be capable of being joined by either electric or arc welding. The operator will then run a welding bead along the juncture between folds 16 and 17. Subsequently, another similar unit will be joined in exactly the same manner until, as in the case where four segments 10 are used, the operator has completed his four welding operations and a finished tube is produced.

Figure 5:
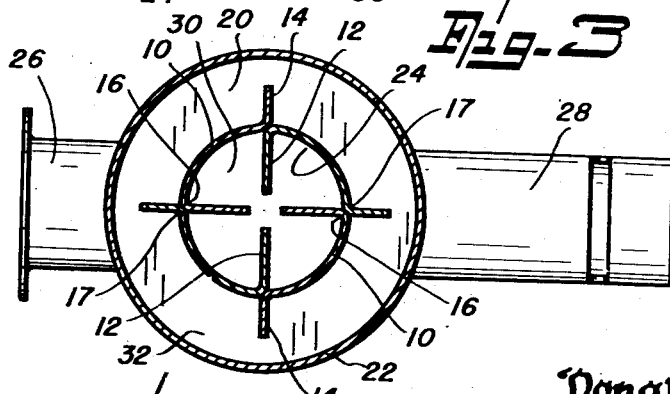
Figure 5 is a horizontal sectional view taken through the device of Figure 2 on a plane near the upper end thereof.

Such a tube is extremely suitable for a heat-transfer device to be used in connection with a pre-heater chamber of a hot air furnace. A gas chamber 20 is formed between an outer wall 22 of the unit and the finned tube, indicated as a whole by the numeral 24, in Figure 5 forms the inner wall of the heat-transfer unit. A flanged nipple 26 is usually employed for connecting the device with the fire box outlet of the furnace and through which passes the products of combustion from the furnace. A discharge nipple 28 is indicated as being located in the lower diametrically opposite side of the member 22 and conveys the gas fumes and smoke out and away from the chamber 20.

It should be apparent, therefore, that a longitudinal chamber 30 is formed within the finned tubular member, and this chamber is across the path of the flow of smoke through the chamber 20. The chamber 20 is closed by a bottom 32 and a cover 34 and suitably sealed to prevent leakage of the smoke and other gases. Air is passed through the chamber 20 generally from the tube or nipple 26 to the outlet nipple 28, and such heat, as would otherwise escape up the chimney with the products of combustion, is absorbed by the outer radial fins 14 and the curved segments, and is transferred internally to the inner fins 12. Fins 12 are thus heated and the heat which they attain is removed or absorbed by the stream of air passing through the chamber 30 and along the faces of the fins and the cylindrical wall of the chamber.

An important advantage of the construction taught by this disclosure is that the outer fins 14 and the inner fins 12 are substantially integral with the segments so that the heat which the outer fins absorb is rapidly passed and conveyed to the inner fins for absorption by the air passed thereover.

In the drawing wherein are employed four arcuate wall segments, the members 10 form approximately one-quarter of the circumference of the cylinder which they comprise when they are joined together. If it is determined that three inner fins or even two inner fins were all that were necessary, a finned tube of that nature would include only three or two arcuate segments which would each be arcuate and comprise one-third of one-half of the circumference of the cylinder which was being formed. By the same principle a tube having, for example, six fins would have six segmental wall sections 10, each being approximately one-sixth the circumference of the tube formed.

If as is often the case in devices of this nature, it be desired that the inner fins or the outer fins have air directing members, such as curved tips or ears or the like, it is a simple matter to merely cut the edge of the fin and to bend the tip out so that air impacts against the curved face of the ear.

I claim:

1. A tube having multiple inner and multiple outer longitudinally extending fins, which tube comprises a plurality of wall sections, each of said wall sections comprising an arcuate tube segment having a flange directed outward along one longitudinal edge and another flange directed inward along the other longitudinal edge of said segment, said plurality of segments being joined together one to another by a bead of welding running longitudinally along the juncture at their points of bend of two adjoining sections to seal the tube in a fluid tight manner, said wall sections and said inner and outer flanges having an equal thickness throughout.

2. The method of forming a symmetrical connector member having multiple inner fins and multiple outer fins, which method comprises forming a plurality of separate wall sections, bending a flange outward along one longitudinal edge of said section, bending another flange inward along the other longitudinal edge of each said section, aligning the external flange of one wall with the internal flange of the adjoining wall sections, and joining a number of separated sections one to another at their points of bend to form a symmetrical conductor member.

3. The method of forming a finned member which comprises the steps of forming a wall section, bending a flange along one edge of said section, bending another flange along the opposite edge of said section in an opposed direction to the first said flange, aligning a flange on one section with the oppositely disposed flange of the adjoining section, and joining a number of said segments one to another at their points of bend.

4. The method of forming a symmetrical conductor member having multiple inner fins, said method comprising forming a longitudinally curved wall section, bending a flange inward along a longitudinal edge of said section, joining a number of said separate sections one to another so that the longitudinally bent edge of one section is joined to the opposite edge of the adjoining section to form a symmetrical conductor member having a plurality of internal fins.

DONALD H. POWERS.